United States Patent
Kilian et al.

(10) Patent No.: US 11,757,490 B2
(45) Date of Patent: *Sep. 12, 2023

(54) DATA TRANSMISSION FROM A USER TERMINAL TO ANOTHER APPARATUS

(71) Applicant: Fraunhofer-Gesellschaft zur Förderung der angewandten Forschung e.V., Munich (DE)

(72) Inventors: Gerd Kilian, Erlangen (DE); Michael Schlicht, Erlangen (DE); Josef Bernhard, Erlangen (DE)

(73) Assignee: FRAUNHOFER-GESELLSCHAFT ZUR FÖRDERUNG DER ANGEWANDTEN FORSCHUNG E.V, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/160,464

(22) Filed: Jan. 28, 2021

(65) Prior Publication Data

US 2021/0152216 A1 May 20, 2021

Related U.S. Application Data

(63) Continuation of application No. PCT/EP2019/070081, filed on Jul. 25, 2019.

(30) Foreign Application Priority Data

Aug. 2, 2018 (DE) .......................... 102018212957.6

(51) Int. Cl.
*H04B 5/00* (2006.01)
*H04R 3/00* (2006.01)

(52) U.S. Cl.
CPC ......... *H04B 5/0006* (2013.01); *H04B 5/0031* (2013.01); *H04R 3/00* (2013.01)

(58) Field of Classification Search
CPC ... H04R 3/00; H04B 5/00; H04B 5/02; H04B 5/0031; H04B 5/0006; H04B 5/0075; H04B 11/00
See application file for complete search history.

(56) References Cited

U.S. PATENT DOCUMENTS

| 2,381,097 A | 8/1945 | Adams |
| 3,098,220 A | 7/1963 | De Graaf |

(Continued)

FOREIGN PATENT DOCUMENTS

| AR | 055430 A1 | 8/2007 |
| CA | 2791516 A1 | 4/2013 |

(Continued)

OTHER PUBLICATIONS

International Search Report dated Dec. 21, 2021, issued in application No. PCT/EP2021/067848.

(Continued)

*Primary Examiner* — Tuan H Nguyen
(74) *Attorney, Agent, or Firm* — McClure, Qualey & Rodack, LLP

(57) ABSTRACT

Embodiments provide a method for transmitting data from a user terminal to another apparatus. The method has a step of generating a signal for driving an electromagnetic actuator of a loudspeaker of the user terminal, and a step of driving the electromagnetic actuator by the generated signal to produce, by the electromagnetic actuator, a magnetic field which carries the data.

7 Claims, 3 Drawing Sheets

(56) References Cited

U.S. PATENT DOCUMENTS

| | | |
|---|---|---|
| 3,764,746 A | 10/1973 | Libby |
| 4,415,769 A | 11/1983 | Gray |
| 5,684,837 A | 11/1997 | Chen |
| 5,887,176 A | 3/1999 | Griffith et al. |
| 6,593,845 B1 | 7/2003 | Friedman et al. |
| 6,636,146 B1 | 10/2003 | Wehoski |
| 6,870,475 B2 | 3/2005 | Fitch et al. |
| 7,307,521 B2 | 12/2007 | Funk et al. |
| 7,551,942 B2 | 6/2009 | Hawker et al. |
| 7,750,435 B2 | 7/2010 | Rofougaran |
| 7,808,389 B2 | 10/2010 | Finkenzeller |
| 7,831,205 B2 | 11/2010 | Jack et al. |
| 7,831,277 B2 | 11/2010 | Hawker et al. |
| 7,903,041 B2 | 3/2011 | LeVan |
| 8,188,854 B2 | 5/2012 | Yamashita |
| 8,190,086 B2 | 5/2012 | Sasaki et al. |
| 8,240,562 B2 | 8/2012 | Washiro |
| 8,254,990 B2 | 8/2012 | Hawker et al. |
| 8,413,895 B2 | 4/2013 | Ota et al. |
| 8,437,695 B2 | 5/2013 | Chatterjee et al. |
| 8,532,570 B2 | 9/2013 | Fukami et al. |
| 8,611,817 B2 | 12/2013 | Kalanithi et al. |
| 8,643,473 B2 | 2/2014 | Suzuki |
| 8,660,612 B2 | 2/2014 | Zhu et al. |
| 8,675,908 B2 | 3/2014 | Pierce et al. |
| 8,711,656 B1 | 4/2014 | Paulson |
| 8,750,929 B2 | 6/2014 | Hawker et al. |
| 8,909,162 B2 | 12/2014 | Ilkov et al. |
| 8,915,428 B1 | 12/2014 | Post |
| 9,001,881 B2 | 4/2015 | Okamura et al. |
| 9,022,285 B2 | 5/2015 | Graylin |
| 9,065,488 B2 | 6/2015 | Kim et al. |
| 9,070,062 B2 | 6/2015 | Rezayee |
| 9,071,289 B2 | 6/2015 | McFarthing |
| 9,142,997 B2 | 9/2015 | Kim et al. |
| 9,160,417 B2 | 10/2015 | Kim et al. |
| 9,166,439 B2 | 10/2015 | Low et al. |
| 9,167,377 B2 | 10/2015 | Clarke |
| 9,225,568 B1 | 12/2015 | Mei et al. |
| 9,240,827 B2 | 1/2016 | Brockenbrough et al. |
| 9,379,784 B2 | 6/2016 | Dhayni |
| 9,401,768 B2 | 7/2016 | Inha et al. |
| 9,413,432 B2 | 8/2016 | Huh et al. |
| 9,455,771 B2 | 9/2016 | Dobyns |
| 9,569,648 B2 | 2/2017 | Rezayee |
| 9,608,327 B1 | 3/2017 | Tai et al. |
| 9,673,866 B2 | 6/2017 | Ikeda |
| 9,716,967 B2 | 7/2017 | Takeuchi |
| 9,787,364 B2 | 10/2017 | Moore et al. |
| 9,793,961 B2 | 10/2017 | Charrat |
| 9,812,254 B2 | 11/2017 | Wakabayashi |
| 9,846,796 B2 | 12/2017 | Rezayee |
| 9,859,950 B2 | 1/2018 | Shao et al. |
| 9,893,570 B2 | 2/2018 | Beyer et al. |
| 9,894,468 B2 | 2/2018 | Brown et al. |
| 9,912,174 B2 | 3/2018 | Soar |
| 9,965,411 B2 | 5/2018 | Hall |
| 10,009,069 B2 | 6/2018 | Kerselaers et al. |
| 10,038,476 B2 | 7/2018 | Kim et al. |
| 10,050,677 B1 | 8/2018 | Thoen |
| 10,074,837 B2 | 9/2018 | Miller et al. |
| 10,097,978 B2 | 10/2018 | Hoffmann |
| 10,177,900 B2 | 1/2019 | Michel et al. |
| 10,263,470 B2 | 4/2019 | Joye et al. |
| 10,270,168 B2 | 4/2019 | Kanno |
| 10,332,676 B2 | 6/2019 | Teggatz et al. |
| 10,360,485 B2 | 7/2019 | Liu et al. |
| 10,367,265 B2 | 7/2019 | Richardson et al. |
| 10,430,701 B2 | 10/2019 | Lee et al. |
| 10,439,449 B2 | 10/2019 | Alonso et al. |
| 10,461,812 B2 | 10/2019 | Zhou et al. |
| 10,476,553 B2 | 11/2019 | Qiu et al. |
| 10,511,349 B2 | 12/2019 | Kahlman |
| 10,574,297 B2 | 2/2020 | Moore et al. |
| 10,593,470 B1 | 3/2020 | Lekas et al. |
| 10,630,073 B2 | 4/2020 | Taya |
| 10,666,325 B2 | 5/2020 | Zhou et al. |
| 10,720,964 B2 | 7/2020 | Woerlee et al. |
| 10,811,913 B2 | 10/2020 | Qiu et al. |
| 11,070,097 B2 | 7/2021 | Park |
| 2005/0237160 A1 | 10/2005 | Nolan et al. |
| 2006/0025172 A1 | 2/2006 | Hawker et al. |
| 2007/0060221 A1 | 3/2007 | Burgan et al. |
| 2008/0173717 A1 | 7/2008 | Antebi et al. |
| 2009/0219137 A1 | 9/2009 | Forster |
| 2009/0227288 A1 | 9/2009 | Hawker et al. |
| 2011/0044484 A1 | 2/2011 | Hawker et al. |
| 2011/0050164 A1 | 3/2011 | Partovi et al. |
| 2011/0140852 A1 | 6/2011 | Wuidart |
| 2011/0300801 A1 | 12/2011 | Kerselaers |
| 2012/0007442 A1 | 1/2012 | Rhodes et al. |
| 2012/0071089 A1 | 3/2012 | Charrat et al. |
| 2012/0289218 A1 | 11/2012 | Hawker et al. |
| 2012/0294473 A1 | 11/2012 | Pierce et al. |
| 2013/0090058 A1 | 4/2013 | Zhu et al. |
| 2013/0094680 A1 | 4/2013 | Allen et al. |
| 2013/0127259 A1 | 5/2013 | Lohr et al. |
| 2013/0143486 A1 | 6/2013 | Zhu et al. |
| 2013/0147281 A1 | 6/2013 | Kamata |
| 2013/0169416 A1 | 7/2013 | Rezayee |
| 2013/0217334 A1 | 8/2013 | Yu et al. |
| 2013/0281016 A1 | 10/2013 | McFarthing |
| 2013/0295845 A1 | 11/2013 | Maenpaa |
| 2014/0073271 A1 | 3/2014 | Ilkov et al. |
| 2014/0080412 A1 | 3/2014 | Kang et al. |
| 2014/0176341 A1 | 6/2014 | Bernhard et al. |
| 2014/0343703 A1 | 11/2014 | Fopchy et al. |
| 2014/0369170 A1* | 12/2014 | Inha .............. H04B 5/0006 367/140 |
| 2015/0035374 A1 | 2/2015 | Park et al. |
| 2015/0041534 A1 | 2/2015 | Rayner et al. |
| 2015/0115735 A1 | 4/2015 | Singh et al. |
| 2015/0155918 A1 | 6/2015 | Van Wageningen |
| 2015/0310237 A1 | 10/2015 | Rezayee |
| 2015/0349896 A1 | 12/2015 | Post et al. |
| 2016/0057542 A1* | 2/2016 | Pasek .............. H04R 27/00 381/414 |
| 2016/0124573 A1 | 5/2016 | Rouaissia |
| 2016/0156387 A1 | 6/2016 | Ota |
| 2017/0041715 A1 | 2/2017 | Jumani et al. |
| 2017/0070080 A1 | 3/2017 | Kang et al. |
| 2017/0098107 A1 | 4/2017 | Rezayee |
| 2017/0117879 A1 | 4/2017 | Chakraborty et al. |
| 2017/0118714 A1 | 4/2017 | Kaechi |
| 2017/0187245 A1 | 6/2017 | Uchida |
| 2017/0188129 A1 | 6/2017 | Sindia et al. |
| 2017/0213831 A1 | 7/2017 | Nakai |
| 2017/0239560 A1 | 8/2017 | Muratov et al. |
| 2017/0256989 A1 | 9/2017 | Yoshii |
| 2017/0289671 A1 | 10/2017 | Patel et al. |
| 2017/0352951 A1 | 12/2017 | Lee |
| 2018/0083670 A1 | 3/2018 | Nakano et al. |
| 2018/0108994 A1 | 4/2018 | Lee |
| 2018/0132019 A1 | 5/2018 | Riedel et al. |
| 2018/0181952 A1 | 6/2018 | Enriquez et al. |
| 2018/0187447 A1 | 7/2018 | Gharabegian |
| 2018/0192176 A1 | 7/2018 | Jumani |
| 2018/0364310 A1 | 12/2018 | Taya |
| 2019/0208336 A1 | 7/2019 | Andersen et al. |
| 2020/0019955 A1 | 1/2020 | Lee et al. |
| 2020/0076474 A1 | 3/2020 | Daga et al. |
| 2020/0143611 A1 | 5/2020 | Shin et al. |
| 2020/0169299 A1 | 5/2020 | Latham et al. |
| 2020/0274404 A1 | 8/2020 | Sankar |
| 2021/0049580 A1 | 2/2021 | Kim |
| 2021/0152216 A1 | 5/2021 | Kilian et al. |
| 2021/0175929 A1 | 6/2021 | Kilian et al. |

FOREIGN PATENT DOCUMENTS

| | | |
|---|---|---|
| CA | 2791516 C | 1/2016 |
| CA | 2842057 C | 11/2017 |
| CH | 365640 A | 11/1962 |
| CN | 1967940 A | 5/2007 |

(56) References Cited

FOREIGN PATENT DOCUMENTS

| | | |
|---|---|---|
| CN | 101900613 A | 12/2010 |
| CN | 202617115 U | 12/2012 |
| CN | 2842057 A1 | 1/2013 |
| CN | 102957454 A | 3/2013 |
| CN | 203014937 U | 6/2013 |
| CN | 103187993 A | 7/2013 |
| CN | 103187998 A | 7/2013 |
| CN | 103187999 A | 7/2013 |
| CN | 103686533 A | 3/2014 |
| CN | 104158305 A | 11/2014 |
| CN | 204442353 U | 7/2015 |
| CN | 105591675 A | 5/2016 |
| CN | 106019955 A | 10/2016 |
| CN | 106233802 A | 12/2016 |
| CN | 106452510 A | 2/2017 |
| CN | 103686533 B | 4/2017 |
| CN | 206302413 U | 7/2017 |
| CN | 107102724 A | 8/2017 |
| CN | 107112635 A | 8/2017 |
| CN | 107154682 A | 9/2017 |
| CN | 107437961 A | 12/2017 |
| CN | 107637096 A | 1/2018 |
| CN | 107690732 A | 2/2018 |
| CN | 107852548 A | 3/2018 |
| CN | 108259069 A | 7/2018 |
| CN | 109586768 A | 4/2019 |
| DE | 10 2011 082 098 A1 | 3/2013 |
| DE | 10 2011 115 092 A1 | 4/2013 |
| DE | 102013217545 A1 | 3/2014 |
| DE | 10 2013 227 141 A1 | 6/2015 |
| DE | 102013217545 B4 | 12/2015 |
| DE | 20 2017 1 02 047 U1 | 7/2017 |
| DE | 202017102047 U1 | 7/2017 |
| DE | 112016002720 T5 | 3/2018 |
| DE | 10 2018 212 957 B3 | 1/2020 |
| DE | 10 2018 214 716 A1 | 3/2020 |
| DE | 10 2019 201 152 B3 | 6/2020 |
| DE | 10 2019 206 848 B3 | 8/2020 |
| EP | 1 250 026 A1 | 10/2002 |
| EP | 0 901 670 B1 | 7/2004 |
| EP | 1 688 016 B1 | 9/2007 |
| EP | 1 654 813 B1 | 11/2007 |
| EP | 1 981 176 A1 | 10/2008 |
| EP | 2 023 661 A1 | 2/2009 |
| EP | 2 159 929 A2 | 3/2010 |
| EP | 2 211 579 A1 | 7/2010 |
| EP | 2 367 294 A1 | 9/2011 |
| EP | 2579554 A1 | 4/2013 |
| EP | 2 688 078 A1 | 1/2014 |
| EP | 2 740 223 A1 | 6/2014 |
| EP | 2 773 087 A1 | 9/2014 |
| EP | 2773087 A1 | 9/2014 |
| EP | 2 625 653 B1 | 11/2014 |
| EP | 2 347 522 B1 | 12/2014 |
| EP | 2 119 029 A1 | 4/2015 |
| EP | 2 338 238 B1 | 3/2016 |
| EP | 2 777 128 B1 | 5/2016 |
| EP | 3 022 823 B1 | 2/2017 |
| EP | 3 168 953 A1 | 5/2017 |
| EP | 2579554 B1 | 3/2018 |
| EP | 3 312 808 A1 | 4/2018 |
| EP | 1 869 842 B1 | 1/2019 |
| EP | 3 480 918 A1 | 5/2019 |
| EP | 3 427 391 B1 | 11/2019 |
| GB | 2 441 051 A | 2/2008 |
| GB | 2 444 799 A | 6/2008 |
| JP | H06-104957 A | 4/1994 |
| JP | 2003152606 A | 5/2003 |
| JP | 2006-121339 A | 5/2006 |
| JP | 2007-006123 A | 1/2007 |
| JP | 5034850 B2 | 9/2012 |
| JP | 5431033 B2 | 3/2014 |
| JP | 5456625 B2 | 4/2014 |
| JP | 2016-192761 A | 11/2016 |
| JP | 6139732 B2 | 5/2017 |
| KR | 20050033764 A | 4/2005 |
| KR | 20-2011-0001743 U | 2/2011 |
| KR | 20140032907 A | 3/2014 |
| KR | 101613793 B1 | 1/2015 |
| KR | 20150001698 A | 1/2015 |
| KR | 101529779 B1 | 6/2015 |
| KR | 10-2015-0114063 A | 10/2015 |
| KR | 20160023750 A | 3/2016 |
| KR | 10-2016-0040484 A | 4/2016 |
| KR | 20160057283 A | 5/2016 |
| KR | 101633856 B1 | 7/2016 |
| KR | 10-2016-0102786 A | 8/2016 |
| KR | 10-2016-0122615 A | 10/2016 |
| KR | 101673240 B1 | 11/2016 |
| KR | 10-1763030 B1 | 7/2017 |
| KR | 10-1797563 B1 | 11/2017 |
| KR | 101870877 B1 | 6/2018 |
| KR | 20180058470 A | 6/2018 |
| RU | 2 566 792 C1 | 10/2015 |
| TW | I281340 B | 5/2007 |
| WO | 95/01678 A1 | 1/1995 |
| WO | 2007032890 A1 | 3/2007 |
| WO | 2007/135434 A1 | 11/2007 |
| WO | 2008/071924 A2 | 6/2008 |
| WO | 2013006954 A1 | 1/2013 |
| WO | 2013/022207 A1 | 2/2013 |
| WO | 2013159429 A1 | 10/2013 |
| WO | 2014/205201 A1 | 12/2014 |
| WO | 2015/096930 A1 | 7/2015 |
| WO | 2015/101120 A1 | 7/2015 |
| WO | 2016/037045 A1 | 3/2016 |
| WO | 2016/076736 A1 | 5/2016 |
| WO | 2016076498 A1 | 5/2016 |
| WO | 2016/153589 A2 | 9/2016 |
| WO | 2016/154762 A1 | 10/2016 |
| WO | 2016171424 A1 | 10/2016 |
| WO | 2016202284 A1 | 12/2016 |
| WO | 2017/144387 A1 | 8/2017 |
| WO | 2017138789 A1 | 8/2017 |
| WO | 2019/172610 A1 | 9/2019 |
| WO | 2020/004940 A1 | 1/2020 |
| WO | 2020/025450 A1 | 2/2020 |
| WO | 2020/043814 A1 | 3/2020 |
| WO | 2020/157098 A1 | 8/2020 |
| WO | 2020/229309 A2 | 11/2020 |

OTHER PUBLICATIONS

"IEEE Standard for Low-Rate Wireless Networks Amendment 2: Low Power Wide Area Network (LPWAN) Extension to the Low-Energy Critical Infrastructure Monitoring (LECIM) Physical Layer (PHY);" IEEE 802.15.4.w; 2020.
https://dewikipedia.org/wiki/Lautsprecher—with pdf-printouts of German and English version. (Please note that the English version does not correspond exactly to the German Wikipedia entry).
http://www.trigonal.de/sel/huw_09.htm—with pdf-printout (no English version available).
International Search Report, dated Nov. 25, 2019, from PCT/EP2019/070081.
English Translation of International Search Report, dated Nov. 25, 2019, from PCT/EP2019/070081.
Written Opinion, dated May 16, 2019, from PCT/EP2019/070081.
IPRP, Nov. 20, 2020, from PCT/EP2019/070081.
Chinese language office action dated Jul. 7, 2021, issued in application No. CN 201980059933.9.
English language translation of Chinese office action dated Jul. 7, 2021, issued in application No. CN 201980059933.9.
Verma, S., et al.; "AudioDAQ: Turning the Mobile Phone's Ubiquitous Headset Port into a Universal Data Acquisition Interface;" Nov. 2012; pp. 197-210.
"Optimalfilter;" https://de.wikipedia.org/wiki/Optimalfilter; pp. 1-4 English language translation; pp. 5-13.
"Der Parallelschwingkreis;" https://elektroniktutor.de/analogtechnik/par_swkr.html; pp. 1.
"(G)MSK-Spektrum;" https://en.wikipedia.org/wiki/Minimum-shift_keying#/media/File:GMSK_PSD.png, zuletzt geöffnet: Apr. 2019; pp. 1-3.

(56) References Cited

OTHER PUBLICATIONS

"Pulsdauermodulation;" https://de.wikipedia.org/wiki/Pulsdauermodulation; pp. 1-6 English translation; pp. 7-17.
"UART-Kommunikation;" https://de.wikipedia.org/wiki/Universal_Asynchronous_Receiver_Transmitter; pp. 1-5 English translation; pp. 6-17.
"Short Range Devices; Low Throughput Networks (LTN); Protocols for radio interface A;" ETSI TS 103 357, V1.1.1; Jun. 2018; pp. 1-113.
"N-Channel Silicon Junction Field Effect Transistor for Impedance Converter of ECM;" Data Sheet 2SK3230; Jan. 2002; pp. 1-8.
"Kapazitätsdiode;" https://de.wikipedia.org/wiki/Kapazit%C3%A4tsdiode; pp. 1-3; English translation; pp. 4-8.
Salzburger, L.; "Mythen der Elektronikentwicklung;" https://fahrplan.events.ccc.de/camp/2015/Fahrplan/system/attachments/2671/original/Mythen_der_Elektronikentwicklung_v2.pdf; pp. 1-117.
Kollmann, R., et al.; "Fallstricke beim Einsatz von MLCCs;" https://www.analog-praxis.de/fallstricke-beim-einsatz-von-mlccs-a-535573/; Aug. 2015; pp. 1-5.
DIGIKEY; "Protecting Inputs in Digital Electronics;" https://www.digikey.com/en/articles/techzone/2012/apr/protecting-inputs-in-digital-electronics; Apr. 2012; pp. 1-9.
"Spule (Elektrotechnik);" Wikipedia (online); https://de.wikipedia.org/w/index,php?title=Spule_(Elektrotechnik); Jun. 2020; pp. 1-14 English translation; pp. 15-21.
SMD-Ferrit; Wikipedia (online); https://de.wikipedia.org/w/index.php?title=Ferrit&oldid=157277430; Aug. 2016; pp. 1-2.
Microchip Technology Inc.; "microIDTM 125 kHz RFID System Design Guide;" Dec. 1998; pp. 1-161.
Premo; "RFID Transponder Inductors;" pp. 30-61.
Written Opinion dated Jun. 15, 2022, issued in application No. PCT/EP2021/067848.
German language office action dated Mar. 21, 2023, issued in application No. EP 19 746 069.4.
Non-Final Office Action dated Jul. 13, 2023, issued in U.S. Appl. No. 17/454,321 (copy not provided).
Non-Final Office Action dated Jul. 3, 2023, issued in U.S. Appl. No. 17/181,492 (copy not provided).

\* cited by examiner

DATA TRANSMISSION FROM A USER TERMINAL TO ANOTHER APPARATUS

CROSS-REFERENCE TO RELATED APPLICATIONS

This application is a continuation of copending International Application No. PCT/EP2019/070081, filed Jul. 25, 2019, which is incorporated herein by reference in its entirety, and additionally claims priority from German Application No. 102018212957.6, filed Aug. 2, 2018, which is also incorporated herein by reference in its entirety.

BACKGROUND OF THE INVENTION

Embodiments of the present invention relate to a method for transmitting data from a user terminal to another apparatus. Further embodiments relate to a user terminal, another apparatus and a system comprising a user terminal and another apparatus. Some embodiments relate to the configuration of a sensor node by a mobile phone.

Conventionally, user-configurable apparatuses, like IoT nodes (like sensor nodes), for example, or WLAN cameras, are configured via a wired connection. However, several electric contacts are used in this case both at the apparatus to be configured and the user terminal, like a mobile phone, employed for configuring the apparatus.

Alternatively, user-configurable apparatuses can be configured via a radio connection. However, dedicated transmission/reception elements are used here.

Furthermore, user-configurable apparatuses can be configured via an optical connection. However, both visual contact and dedicated optical components are used here.

Additionally, user-configurable apparatuses can be configured via an acoustic connection, as is, for example, usually done in smoke detectors. However, using an acoustic connection entails a microphone in the apparatus.

Additionally, user-configurable devices can be configured by means of magnetic coupling. Usually, NFC (near field communication) is employed here, which, however, entails additional NFC elements in the apparatus. To aggravate the situation, not all user terminals support NFC. Currently available iPhones, for example, are only able to read, but not write using NFC.

Furthermore, making use of the magnetic effect of loudspeakers is known. Thus, U.S. Pat. No. 2,381,079 A describes a so-called telephone listening amplifier which makes use of the magnetic effect of loudspeakers. Here, the magnetic field of a loudspeaker is received, amplified and converted to an acoustic signal by another loudspeaker.

U.S. Pat. No. 4,415,769 A describes an apparatus allowing transmitting and receiving signals via a telephone line to at least one inductive element of the telephone apparatus by electromagnetic coupling.

U.S. Pat. No. 3,764,746 A describes a data coupler for coupling a data terminal to a telephone network with no direct conducting connection. Here, data signals from an induction coil are electromagnetically coupled into a loudspeaker of a telephone receiver.

Consequently, the object underlying the present invention is providing a concept which allows a cheap configuration of an apparatus easy to be performed by a user.

SUMMARY

According to an embodiment, a method for transmitting data from a user terminal to another apparatus may have the steps of: generating a signal for driving an electromagnetic actuator of a loudspeaker of the user terminal, and driving the electromagnetic actuator by the generated signal to produce, by the electromagnetic actuator, a magnetic field which carries the data, detecting the magnetic field by a magnetic detector of the other apparatus to receive the data, configuring the other apparatus based on the received data; wherein configuring the other apparatus has connecting the other apparatus to a communication network using the received data, wherein the steps of generating and driving are performed by the user terminal, wherein the steps of detecting and configuring are performed by the other apparatus.

According to another embodiment, a system may have: a user terminal for transmitting data to another apparatus, the user terminal having a loudspeaker having an electromagnetic actuator, the user terminal having a signal generator, the signal generator being configured to generate a signal for driving the electromagnetic actuator, and to drive the electromagnetic actuator by the generated signal to produce, by the electromagnetic actuator, a magnetic field which carries the data, and another apparatus, the other apparatus having a magnetic detector and a microcontroller, the magnetic detector being configured to detect the magnetic field which carries the data, wherein the microcontroller is configured to configure the other apparatus based on the received data, the microcontroller being configured to connect the other apparatus to a wireless network based on the received data.

According to another embodiment, an apparatus for receiving data which a magnetic field carries may have: a magnetic detector configured to detect the magnetic field which carries the data, and a microcontroller configured to evaluate the detected magnetic field to receive the data, wherein the magnetic detector is connected directly to an input or inputs of a comparator of the microcontroller.

Embodiments provide a method for transmitting data from a user terminal to another apparatus. The method comprises a step of generating a signal for driving an electromagnetic actuator of a loudspeaker of the user terminal and a step of driving the electromagnetic actuator by the generated signal to produce, by the electromagnetic actuator, a magnetic field which carries the data.

The idea underlying the present invention is using a loudspeaker of a conventional user terminal (like a mobile phone (smart phone) or tablet computer, for example) to produce a magnetic field which carries the data (like configuration data for configuring the other apparatus, for example) to be transmitted to the other apparatus (like an IoT node or a WLAN camera). This offers the advantage that every standard user terminal, like mobile phone or tablet computer, for example, can be used. A cheap magnetic detector which can be realized, for example, by means of an LC oscillating circuit and thus is cheaper by a multiple than conventionally used components, like dedicated radio elements, optical components, acoustic sensors or NFC modules, can be used in the other apparatus for detecting the magnetic field which carries the data.

In embodiments, the generated signal can be in the ultrasonic frequency range or higher. Exemplarily, a frequency or a frequency range of the generated signal can be above 16 kHz, like in the region between 16 kHz and 22 kHz or higher.

In embodiments, a ratio between carrier frequency and modulation bandwidth of the generated signal can be smaller than 25% (or 20% or 15% or 10%).

In embodiments, the data can be modulated onto the generated signal. Exemplarily, the data can be modulated onto the generated signal by means of FSK (frequency shift keying), MSK (minimum shift keying) or GMSK (Gaussian minimum shift keying). Another type of modulation can of course also be used, like ASK (amplitude shift keying), PSK (phase shift keying) or OOK (on-off keying, i.e. a type of amplitude shift keying where the carrier is switched on and off), for example.

In embodiments, the data can be configuration data for configuring the other apparatus. Exemplarily, the other apparatus can be a user-configurable apparatus, i.e. an apparatus to be configured by a user.

In embodiments, the method can additionally comprise a step of generating a further signal for driving the electromagnetic actuator of the loudspeaker of the user terminal, wherein the further signal is in the audio frequency range of humans, and a step of driving the electromagnetic actuator by the generated further signal to produce sound waves which carry audio and/or voice information, by the loudspeaker of the user terminal.

In embodiments, the voice information can comprise instructions for a user of the user terminal for transmitting the data to the other apparatus.

In embodiments, the audio information can be music.

In embodiments, the electromagnetic actuator can be driven at least partly in parallel by the generated signal and the generated further signal.

In embodiments, the steps of generating and driving can be performed by the user terminal.

In embodiments, the user terminal can be a mobile phone or tablet computer.

In embodiments, the method can further comprise a step of approximating the user terminal and the other apparatus before producing the magnetic field which carries the data.

In embodiments, the method can further comprise a step of detecting the magnetic field by a magnetic detector of the other apparatus to receive the data.

In embodiments, the method can further comprise a step of configuring the other apparatus based on the received data.

In embodiments, configuring the other apparatus can comprise connecting the other apparatus to a communication network using the received data.

In embodiments, the steps of detecting and configuring can be performed by the other apparatus.

In embodiments, the other apparatus can be an IoT node or a WLAN camera. The IoT node can be a sensor node or actuator node, for example.

Further embodiments provide a user terminal for transmitting data to another apparatus. The user terminal comprises a loudspeaker having an electromagnetic actuator, and a signal generator, the signal generator being configured to generate a signal for driving the electromagnetic actuator, and to drive the electromagnetic actuator by the generated signal to produce, by the electromagnetic actuator, a magnetic field which carries the data.

Further embodiments provide a system comprising a user terminal and another apparatus. The user terminal comprises a loudspeaker having an electromagnetic actuator, and a signal generator, the signal generator being configured to generate a signal for driving the electromagnetic actuator, and to drive the electromagnetic actuator by the generated signal to produce, by the electromagnetic actuator, a magnetic field which carries the data. The other apparatus comprises a magnetic detector configured to detect the magnetic field which carries the data.

In embodiments, the other apparatus can comprise a microcontroller configured to evaluate the detected magnetic field to receive the data.

In embodiments, the magnetic detector can comprise an LC oscillating circuit.

In embodiments, the LC oscillating circuit can be connected directly to an input or inputs of a comparator of a microcontroller of the other apparatus. Alternatively, the LC oscillating circuit can also be connected to an input or inputs of the analog-to-digital converter of the microcontroller.

In embodiments, the microcontroller can be configured to change, responsive to an interrupt of the comparator, from an operating mode of reduced current consumption to a normal operating mode.

In embodiments, the microcontroller can be configured to provide the comparator with an offset voltage to increase a signal threshold for triggering the interrupt.

In embodiments, the microcontroller can be configured to reduce or switch off the offset voltage while receiving the data.

In embodiments, the microcontroller can be configured to evaluate switching times of the comparator to receive the data.

In embodiments, the microcontroller can be configured to configure the other apparatus based on the received data.

In embodiments, the microcontroller can be configured to connect the other apparatus to a wireless network based on the received data.

Further embodiments provide an apparatus for receiving data which a magnetic field carries. The apparatus comprises a magnetic detector and a microcontroller. The magnetic detector is configured to detect the magnetic field which carries the data. The microcontroller is configured to evaluate the detected magnetic field to receive the data. Thus, the magnetic detector is connected directly to an input or inputs of a comparator of the microcontroller.

In embodiments, the magnetic detector is an LC oscillating circuit.

BRIEF DESCRIPTION OF THE DRAWINGS

Embodiments of the present invention will be described below in greater detail referring to the appended drawings, in which.

DETAILED DESCRIPTION OF THE INVENTION

Figure 1:
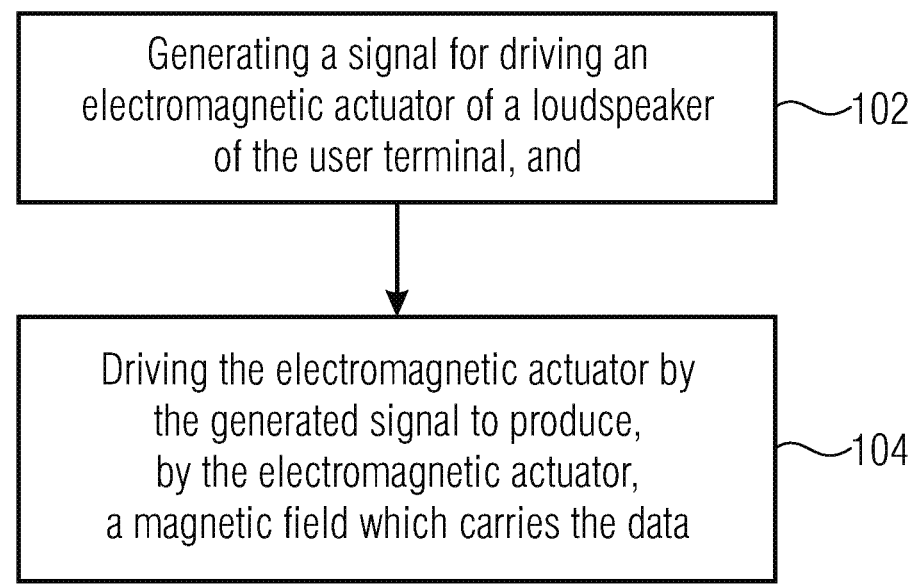
FIG. 1 is a flow chart of a method for transmitting data from a user terminal to another apparatus, in accordance with an embodiment.

In the following description of the embodiments of the present invention, equal elements or elements of equal effect, in the figures, are provided with equal reference numerals so that the description thereof is mutually interchangeable.

FIG. 1 shows a flow chart of a method 100 for transmitting data from a user terminal to another apparatus, in accordance with an embodiment. The method 100 comprises a step 102 of generating a signal for driving an electromagnetic actuator of a loudspeaker of the user terminal. Additionally, the method 100 comprises a step 104 of driving the electromagnetic actuator by the generated signal to generate, by the electromagnetic actuator, a magnetic field which carries the data.

Subsequently, embodiments of the method 100 for transmitting data shown in FIG. 1 will be discussed in greater detail referring to FIGS. 2 to x.

Figure 2:
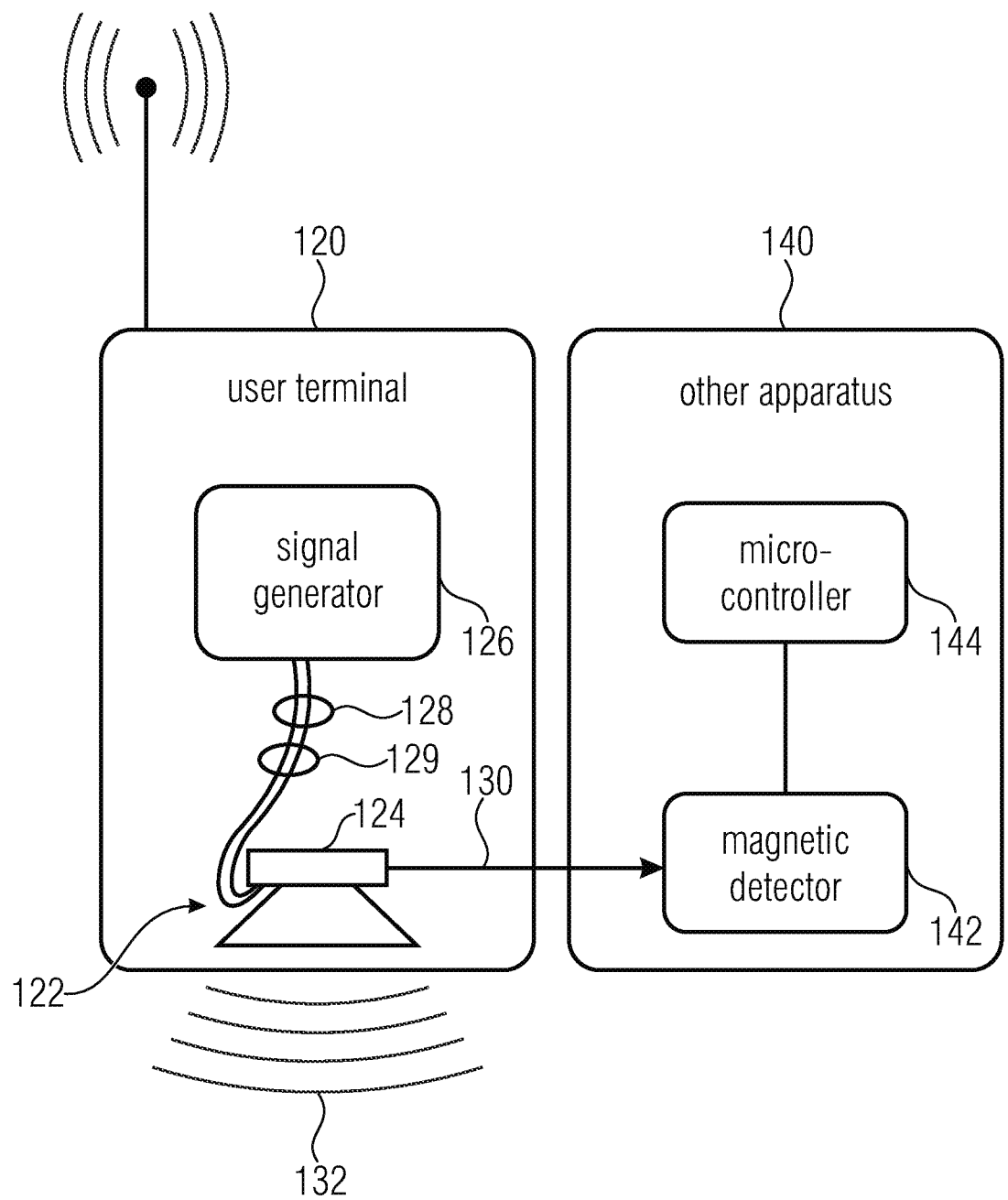
FIG. 2 shows a schematic block circuit diagram of a system comprising a user terminal and another apparatus, in accordance with an embodiment.

FIG. 2 shows a schematic block circuit diagram of a system 110 comprising a user terminal 120 and another apparatus 140, in accordance with an embodiment.

The user terminal 120 comprises a loudspeaker 122 having an electromagnetic actuator 124 (like a voice coil, for example), and a signal generator 126. The signal generator 126 is configured to generate a signal 128 for driving the electromagnetic actuator 124, and to drive the electromagnetic actuator 124 by the generated signal 128 to produce, by the electromagnetic actuator 124, a magnetic field 130 which carries the data.

In embodiments, the generated signal 128 can be in the ultrasonic frequency range or higher. The sound waves 132 also produced by driving the electromagnetic actuator 124 by the generated signal 128 are thus in a frequency range not audible or only poorly audible for humans or are, due to the upper cutoff frequency of the loudspeaker 122, not emitted or only in an attenuated manner.

Exemplarily, a frequency or frequency range of the generated signal 128 can be above 16 kHz, for example in the region between 16 kHz and 22 kHz.

In embodiments, the data can be modulated onto the generated signal 128, for example by FSK (frequency shift keying), MSK (minimum shift keying) or GMSK (Gaussian minimum shift keying). Another type of modulation can of course also be used, like ASK (amplitude shift keying), PSK (phase shift keying) or OOK (on-off keying, a type of amplitude shift keying where the carrier is switched on and off), for example.

In embodiments, the ratio between carrier frequency and modulation bandwidth of the generated signal can be smaller than 25% (or smaller than 20% or smaller than 15%, for example).

In embodiments, the user terminal 120 can be a mobile phone (smart phone) or tablet computer.

As can be recognized in FIG. 2, the other apparatus 140 comprises a magnetic detector 142 configured to detect the magnetic field 130 which carries the data. Additionally, the other apparatus 140 comprises a microcontroller 144 configured to evaluate the detected magnetic field 130 to receive the data.

In embodiments, the data which the magnetic field 130 carries can be configuration data. The microcontroller 144 can be configured to configure the other apparatus 140 based on the configuration data, like connect it to a wireless network.

Exemplarily the other apparatus 140 can be a user-configurable apparatus, like an IoT (internet of things) node (like a sensor node or actuator node) or a WLAN camera, for example. In this case, the configuration data can comprise information for connecting the user-configurable apparatus 140 to a wireless network (like sensor network or WLAN, for example), like a network name and network key, for example. Of course, other parameters, like a frequency channel to be used, time slots to be used or a hopping pattern to be used, can be associated to the user-configurable apparatus 140 by the configuration data.

Embodiments of the present invention thus provide a cheap and generally available method of configuring other apparatuses 140, like IoT nodes (like sensor nodes), for example.

Nowadays, mobile phones are generally wide-spread as user terminals 120. Loudspeakers 122 are incorporated into these mobile phones. These are (almost) exclusively so-called electromagnetic loudspeakers.

Figure 3:
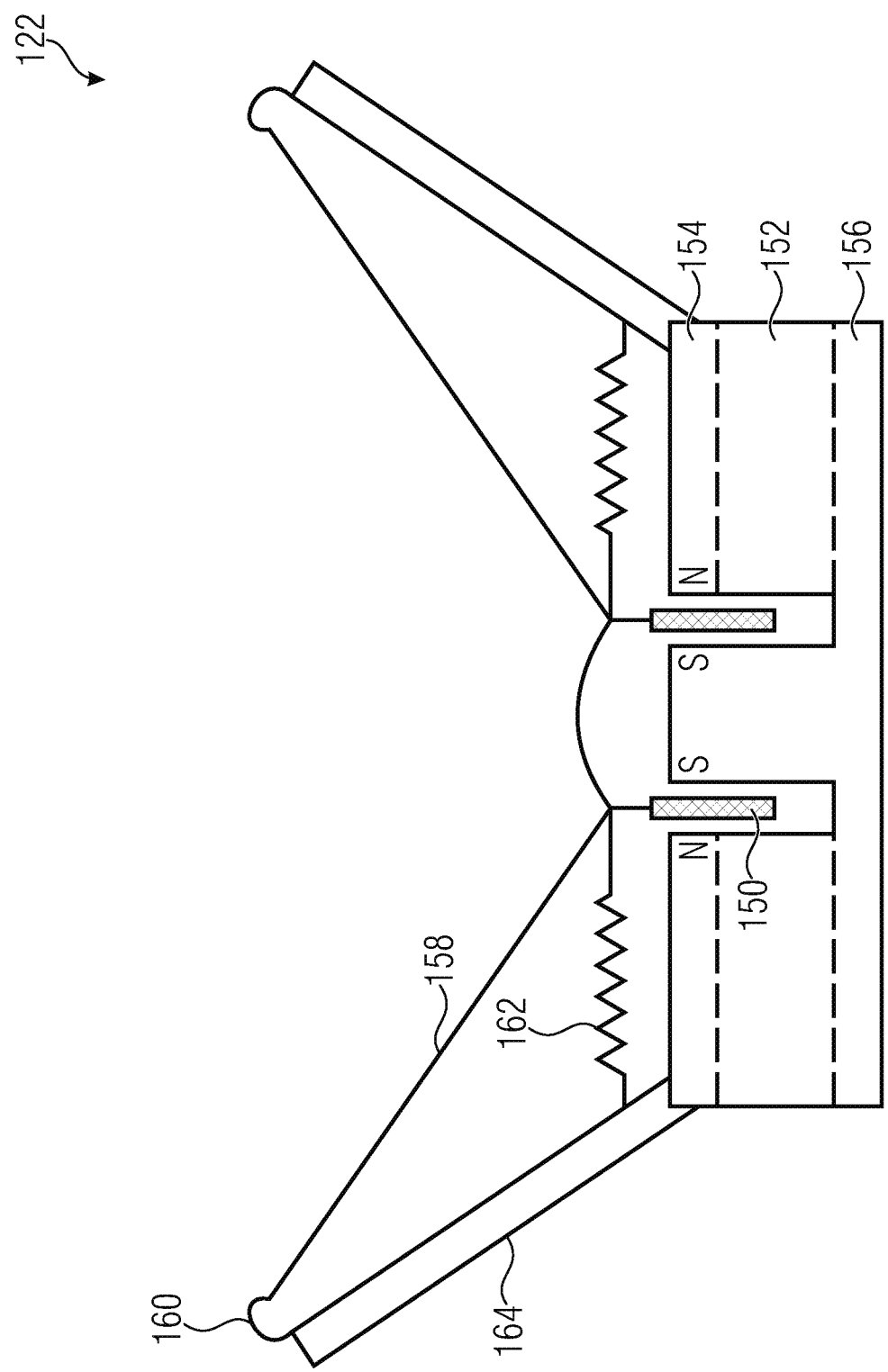
FIG. 3 shows a schematic sectional view of an electromagnetic loudspeaker.

FIG. 3 shows a schematic sectional view of such an electromagnetic loudspeaker 122. The loudspeaker 122 comprises, as an electromagnetic actuator, a voice coil 150 which is supported to be movable within a magnet 152 with differently polarized pole plates 154 and 156. The voice coil 150 is connected to a diaphragm 158, wherein the diaphragm 158 is supported to be deflectable via a bead 160 and a suspension 162 with a frame 164 of the loudspeaker 122.

The user terminal 120 (like mobile phone) comprises a signal generator 126 having an amplifier connected to the voice coil 150 of the loudspeaker 122 via two terminals. To output an audio signal, the audio signal is passed to the amplifier which passes the signal onto the voice coil 150 in an amplified manner. Thus, the diaphragm 158 of the loudspeaker 122 is deflected and the result is an acoustic signal. However, apart from the acoustic signal, a magnetic field 130 also forms, due to the principle of operation, the temporal course of which is determined by the audio signal.

Other apparatuses 140, like sensor nodes, can be configured cheaply and in an energy-efficient manner by receiving this magnetic field 130 by a magnetic detector 142, like a simple oscillating circuit (like only one coil and one capacitor, for example).

Detailed embodiments of the present invention will be described below in greater detail.

1. Electromagnetic Field by Means of Loudspeaker in the User Terminal

In embodiments, a magnetic field 130 which carries the data to be transmitted to another apparatus is produced by a loudspeaker 122 of a user terminal 120.

Exemplarily, an app (or application software) can be used on the user terminal 120 (like a mobile phone) to drive the loudspeaker 122 (for example by means of the signal generator). A magnetic field 130 which carries the data is produced by the electromagnetic loudspeaker 122. The other apparatus 140 (like IoT node, like sensor node or actuator node, for example) is provided with a magnetic detector 142. Thus, it is, for example, possible to configure the other apparatus using the user terminal.

In embodiments, the magnetic field produced by the loudspeaker of the user terminal (like mobile phone, for example) is made use of (for example to transmit data).

In embodiments, the magnetic field is received by a magnetic detector (like LC oscillating circuit, for example) of the other apparatus (like sensor node).

In embodiments, the data can be used for configuration in the other apparatus (like sensor node, for example).

The embodiments described herein have the following advantages. User terminals are generally available (everybody has a mobile phone). Additionally, only a cheap magnetic detector (like only one coil and only one capacitor, for example) has to be provided on the side of the other apparatus. Additionally, the method is interference-proof (no sound). Additionally, the method is interception-proof since it works only over short distances (a few centimeters) (proximity to the other apparatus to be ensured). Additionally, the other apparatus (like sensor node) can be sealed/encapsulated in an air-tight manner.

2. Using Frequencies in the Ultrasonic Range

Embodiments use the inaudible ultrasonic range. This means that the sound simultaneously produced by the loudspeaker 122 is not disturbing. Additionally, only a small modulation bandwidth relative to the frequency is used, for example the ratio between the carrier frequency and the modulation bandwidth of the generated signal can be smaller than 25% (or smaller than 20% or smaller than 15%, for example). This means that an LC oscillating circuit of high quality can be used on the side of the other apparatus 140 (like sensor node). This results in higher voltages at the LC oscillating circuit so that a simple current-saving detector can be used at the receiver.

In embodiments, frequencies in the inaudible range are used.

In embodiments, the frequency of the signal is high relative to the modulation bandwidth.

3. Direct Connection of the Oscillating Circuit to the Comparators in the Microcontroller on the Other Apparatus In embodiments, using an LC oscillating circuit of high quality and using waveforms (magnetic field 130) for transmitting the data (like configuration data) allows directly coupling the system (i.e. the LC oscillating circuit) to the comparator of the microcontroller 144 of the other apparatus 140. When the oscillating circuit is excited by a magnetic field 130 produced by the loudspeaker 122 of the user terminal 120 (like mobile phone), the comparator will switch and can wake up the microcontroller from the energy-saving sleeping mode by the interrupt.

In embodiments, the data transmission/configuration can thus be performed using the oscillating circuit at the comparator input. An analog-to-digital converter (of the microcontroller) can be used instead of the comparator.

In embodiments, waveforms, like FSK or MSK, for example, can be used for the transmission, which contain the information to be transmitted in the signal phase.

In embodiments, the LC oscillating circuit can be coupled directly to comparator inputs of the microcontroller 144.

In embodiments, the microcontroller 144 can be woken from the sleeping mode by the interrupt of the comparator.

In embodiments, the comparator can be provided with a small offset voltage so that the comparator will trigger interrupts only with signals above a threshold (like signals of a certain size).

In embodiments, this offset voltage can be reduced/switched off again for data transmission.

In embodiments, the switching times of the comparator can be evaluated by the microcontroller for data transmission.

4. Parallel Music Output/Voice Announcement

Due to non-linearity, unpleasant disturbing noise can frequently be audible in the loudspeaker when reproducing ultrasonic signals. When using ultrasound, the user does not hear whether the user terminal (like mobile phone) really outputs a signal or is muted. Thus, in embodiments, an audible signal can be output in parallel to the ultrasonic signal for transmitting the data (like for configuring the other apparatus). This audible signal can also comprise instructions for configuration, like "bring the mobile phone close to the sensor node".

In embodiments, the signal generator (see FIG. 2) can thus be configured to generate a further signal 129 for driving the electromagnetic actuator 124 of the loudspeaker 122 of the user terminal 120, wherein the further signal 129 is in the audio frequency range of humans, and to drive the electromagnetic actuator 124 by the generated further signal 129 to produce sound waves 132 which carry audio and/or voice information, by the loudspeaker 122 of the user terminal 120.

By using an oscillating circuit, tuned to the ultrasonic frequency, at the other apparatus (like sensor node, for example), this additional signal having low-frequency voice portions does not interfere in the data transmission (like configuration).

Generally—without interrupting the standard output of music/voice—data can be transmitted in the ultrasonic region, both acoustically and additionally inaudibly by the magnetic field of the loudspeaker.

Although some aspects have been described in the context of an apparatus, it is clear that these aspects also represent a description of the corresponding method, such that a block or device of an apparatus also corresponds to a respective method step or a feature of a method step. Analogously, aspects described in the context of or as a method step also represent a description of a corresponding block or item or feature of a corresponding apparatus. Some or all of the method steps may be executed by (or using) a hardware apparatus, like, for example, a microprocessor, a programmable computer or an electronic circuit. In some embodiments, some or several of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer-readable.

Some embodiments according to the invention include a data carrier comprising electronically readable control signals, which are capable of cooperating with a programmable computer system such that one of the methods described herein is performed.

Generally, embodiments of the present invention can be implemented as a computer program product with a program code, the program code being operative for performing one of the methods when the computer program product runs on a computer.

The program code may, for example, be stored on a machine-readable carrier.

Other embodiments comprise the computer program for performing one of the methods described herein, wherein the computer program is stored on a machine-readable carrier.

In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein. The data carrier, the digital storage medium or the computer-readable medium are typically tangible and/or non-volatile or non-transitory.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises processing means, for example a computer, or a programmable logic device, configured or adapted to perform one of the methods described herein.

A further embodiment comprises a computer having installed thereon the computer program for performing one of the methods described herein.

A further embodiment according to the invention comprises an apparatus or a system configured to transfer a computer program for performing one of the methods described herein to a receiver. The transmission can, for example, be performed electronically or optically. The receiver may, for example, be a computer, a mobile device, a memory device or the like. The apparatus or system may, for example, comprise a file server for transferring the computer program to the receiver.

In some embodiments, a programmable logic device (for example a field-programmable gate array, FPGA) may be used to perform some or all of the functionalities of the methods described herein. In some embodiments, a field-programmable gate array may cooperate with a microprocessor in order to perform one of the methods described herein. Generally, in some embodiments, the methods are performed by any hardware apparatus. This can be universally applicable hardware, such as a computer processor (CPU), or hardware specific for the method, such as ASIC.

The apparatuses described herein can, for example, be implemented using a hardware apparatus, or using a computer, or using a combination of a hardware apparatus and a computer.

The apparatuses described herein, or any components of the apparatuses described herein, can be implemented, at least partly, in hardware and/or in software (computer program).

The methods described herein can, for example, be implemented using a hardware apparatus, or using a computer, or using a combination of a hardware apparatus and a computer.

The methods described herein, or any components of the methods described herein, can be executed, at least partly, by hardware and/or by software.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for receiving data which a magnetic field carries, the apparatus comprising:
    an LC oscillating circuit configured to detect the magnetic field which carries the data, and
    a microcontroller configured to evaluate the detected magnetic field to receive the data,
    wherein the LC oscillating circuit is connected directly to an input or inputs of a comparator of the microcontroller.

2. The apparatus as claimed in claim 1,
    wherein the microcontroller is configured to change, responsive to an interrupt of the comparator, from an operating mode of reduced current consumption to a normal operating mode.

3. The apparatus as claimed in claim 2,
    wherein the microcontroller is configured to provide the comparator with an offset voltage to increase a signal threshold for triggering the interrupt.

4. The apparatus as claimed in claim 3,
    wherein the microcontroller is configured to reduce or switch off the offset voltage while receiving the data.

5. The apparatus as claimed in claim 1,
    wherein the microcontroller is configured to evaluate switching times of the comparator to receive the data.

6. The apparatus as claimed in claim 1,
    wherein the microcontroller is configured to connect the apparatus to a wireless network based on the received data.

7. System, the system comprising:
    an apparatus as claimed in claim 1, and
    a user terminal for transmitting data to the apparatus, the user terminal comprising a loudspeaker comprising an electromagnetic actuator, the user terminal comprising a signal generator, the signal generator being configured to generate a signal for driving the electromagnetic actuator, and to drive the electromagnetic actuator by the generated signal to produce, by the electromagnetic actuator, a magnetic field which carries the data.

\* \* \* \* \*